US012671145B2

(12) United States Patent
Guo et al.

(10) Patent No.: US 12,671,145 B2
(45) Date of Patent: Jun. 30, 2026

(54) SEPARATOR AND LITHIUM-ION BATTERY

(71) Applicant: Ningde Amperex Technology Limited, Ningde (CN)

(72) Inventors: Dongyang Guo, Ningde (CN); Gengjin Kong, Ningde (CN); Kebing Guo, Ningde (CN); Xinghua Tao, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 211 days.

(21) Appl. No.: 18/328,218

(22) Filed: Jun. 2, 2023

(65) Prior Publication Data

US 2023/0327290 A1 Oct. 12, 2023

Related U.S. Application Data

(63) Continuation of application No. 16/258,708, filed on Jan. 28, 2019, now abandoned.

(30) Foreign Application Priority Data

Feb. 26, 2018 (CN) ........................ 201810159514.X

(51) Int. Cl.

| | |
|---|---|
| ***H01M 50/46*** | (2021.01) |
| ***C08G 69/26*** | (2006.01) |
| ***C08L 77/06*** | (2006.01) |
| ***C08L 77/10*** | (2006.01) |
| ***C08L 77/12*** | (2006.01) |
| ***C09D 177/06*** | (2006.01) |
| ***C09D 177/10*** | (2006.01) |
| ***H01M 10/0525*** | (2010.01) |
| ***H01M 10/0565*** | (2010.01) |
| ***H01M 50/42*** | (2021.01) |
| ***H01M 50/423*** | (2021.01) |
| ***H01M 50/426*** | (2021.01) |
| ***H01M 50/431*** | (2021.01) |
| ***H01M 50/434*** | (2021.01) |
| ***H01M 50/451*** | (2021.01) |
| ***H01M 50/457*** | (2021.01) |

(52) U.S. Cl.

CPC .......... *H01M 50/461* (2021.01); *C08G 69/26* (2013.01); *C08L 77/06* (2013.01); *C08L 77/10* (2013.01); *C09D 177/06* (2013.01); *C09D 177/10* (2013.01); *H01M 10/0525* (2013.01); *H01M 10/0565* (2013.01); *H01M 50/42* (2021.01); *H01M 50/423* (2021.01); *H01M 50/426* (2021.01); *H01M 50/431* (2021.01); *H01M 50/434* (2021.01); *H01M 50/451* (2021.01); *H01M 50/457* (2021.01); *C08L 77/12* (2013.01); *C08L 2203/20* (2013.01); *H01M 2300/0082* (2013.01)

(58) Field of Classification Search

CPC ............ H01M 50/461; H01M 50/426; H01M 50/457; H01M 50/423; H01M 50/451; H01M 50/434; H01M 50/42; H01M 50/431; H01M 10/0525; H01M 10/0565; H01M 2300/0082; H01M 10/0569; H01M 50/446; H01M 10/4235; H01M 2300/0037; C08G 69/26; C08L 77/06; C08L 77/10; C08L 2203/20; C09D 177/06; C09D 177/10; Y02E 60/10

USPC .......................................................... 429/247

See application file for complete search history.

(56) References Cited

U.S. PATENT DOCUMENTS

| | | | |
|---|---|---|---|
| 2007/0213501 | A1 | 9/2007 | Bruchmann et al. |
| 2011/0171514 | A1 | 7/2011 | Nishikawa et al. |
| 2012/0308898 | A1 | 12/2012 | Sawamoto et al. |
| 2016/0017145 | A1 | 1/2016 | Maeda et al. |
| 2017/0033347 | A1 | 2/2017 | Murakami et al. |
| 2017/0077552 | A1 | 3/2017 | Taeda et al. |
| 2018/0159135 | A1 | 6/2018 | Ito et al. |
| 2018/0248162 | A1 | 8/2018 | Takamatsu et al. |
| 2018/0315982 | A1 | 11/2018 | Daidoji et al. |
| 2019/0033066 | A1 | 1/2019 | Hoshida et al. |
| 2019/0148699 | A1 | 5/2019 | Akike et al. |

FOREIGN PATENT DOCUMENTS

| | | | |
|---|---|---|---|
| CN | 101707242 | A | 5/2010 |
| CN | 102751460 | A | 10/2012 |
| CN | 103441230 | A | 12/2013 |
| CN | 103904276 | A | 7/2014 |
| CN | 104262674 | A | 1/2015 |
| CN | 105431576 | A | 3/2016 |
| CN | 105552284 | A | 5/2016 |
| CN | 105633326 | A | 6/2016 |
| CN | 105702900 | A | 6/2016 |

(Continued)

OTHER PUBLICATIONS

"Soluble High-Temperature Polymers Containing a Tetraphenylthiophene Unit" by Yoshio Imai et al. in Polymer Plastics Technology and Engineering (1989), 28(4), 371-414; (Year: 1989).*

(Continued)

*Primary Examiner* — Niki Bakhtiari
*Assistant Examiner* — Omar M Kekia
(74) *Attorney, Agent, or Firm* — Maier & Maier, PLLC

(57) ABSTRACT

A separator and a lithium-ion battery. The separator includes a porous substrate, and a first coating layer arranged on at least one surface of the porous substrate, wherein the first coating layer includes an aromatic polyamide. An aramid coating layer is used; the aromatic polyamide in the aramid coating layer swells or plasticizes under the action of a solvent and a lithium salt in the electrolyte at high temperature or normal temperature, to increase the elongation of the separator, while improving the safety performance of the lithium-ion battery by interaction between the aramid coating layer and the electrode active material or the binder.

16 Claims, No Drawings

(56) References Cited

FOREIGN PATENT DOCUMENTS

| | | | |
|---|---|---|---|
| JP | H06256259 | A | 9/1994 |
| JP | 2012069339 | A | 4/2012 |
| KR | 1020170056452 | A | 5/2017 |

OTHER PUBLICATIONS

Guo, Dongyang; Office Action for Chinese Application No. 201810159514.X, filed Feb. 26, 2018, mailed Nov. 23, 2020, 10 pages.
Guo, Dongyang; Office Action for Chinese Application No. 20181059514.X, filed Feb. 26, 2018, mailed Feb. 6, 2020, 11 pages.
"Soluble High-Temperature Polymers Containing a Tetraphenylthiophene Unit" by Yoshino Imai et al., in Polymer Plastics Technology and Engineering (1989), 28(4), 371-414. (Year: 1989).
English Language machine translation of Imai Yoshio et al. JPH06256259 (A)-1994-09-13 (Year: 1994).
First Office Action issued on Jun. 2, 2020, in corresponding Chinese Application No. 201810159514.X, 22 pages.
Second Office Action issued on Nov. 13, 2020, in corresponding Chinese Application No. 201810159514.X, 10 pages.
Notification to Grant Patent Right for Invention issued on Jan. 26, 2021, in corresponding Chinese Application No. 201810159514.X, 4 pages.

* cited by examiner

SEPARATOR AND LITHIUM-ION BATTERY

PRIORITY CLAIM AND CROSS-REFERENCE

This application is a Continuation of U.S. application Ser. No. 16/258,708, filed on Jan. 28, 2019, and claims priority to and benefits of Chinese Patent Application Serial No. 201810159514.X, filed with China National Intellectual Property Administration on Feb. 26, 2018, entitled "SEPARATOR AND LITHIUM-ION BATTERY", and the entire content of which is incorporated herein by reference.

FIELD

Examples of the present application relate to the field of battery, in particular, to a separator and a lithium-ion battery.

BACKGROUND

With the popularity of consumer electronics products and electric vehicles, higher requirements are put forward on the electrical and safety performance of batteries. For example, the battery must maintain high safety and reliability in addition to the need to have a high volume or weight energy density. Lithium-ion batteries have a higher energy density advantage over other types of batteries.

In recent years, in order to increase the energy density of the electrode assembly, a thickness of a separator and a coating layer are continuously reduced, which reduces the safety and reliability of the lithium-ion battery. Therefore, an effective technical means is needed to achieve an effect that the separator is thinned while the resistance to stress and heat is increased.

SUMMARY

In view of the above problems, the present invention provides a multifunctional aramid separator with high elongation, high adhesion and high heat resistance. The separator is swelled or plasticized under the action of the solvent and the lithium salt in the electrolyte, and the aramid coating layer acts on the electrode active material or the binder to improve the elongation of the separator and improve the safety performance of the electrode assembly.

A lithium-ion battery, comprising a separator; and an electrolyte; wherein the separator comprises a porous substrate and a first coating layer, the first coating comprises an aromatic polyamide, and the electrolyte comprises a linear ester compound.

In above lithium-ion battery, wherein the first coating layer is arranged on at least one surface of the porous substrate.

In above lithium-ion battery, the separator further comprises a second coating layer, and the second coating layer comprises inorganic particles, a polymer or a combination thereof.

In above lithium-ion battery, the first coating layer further comprises inorganic particles, a polymer or a combination thereof.

In above lithium-ion battery, the inorganic particles are at least one selected from a group consisting of silicon oxide, alumina, titanium oxide, zinc oxide, magnesium oxide, boehmite, magnesium hydroxide, calcium titanate, barium titanate, lithium phosphate, lithium titanium phosphate, lithium lanthanum titanate.

In above lithium-ion battery, the polymer is at least one selected from a group consisting of polymethyl methacrylate, polyvinylidene fluoride, polytetrafluoroethylene, a copolymer of vinylidene fluoride-hexafluoropropylene, polyhexafluoropropylene, polyacrylonitrile.

In above lithium-ion battery, the aromatic polyamide comprises at least selected from a group consisting of para-aramid, meta-aramid, semi-aromatic polyamide, copolyaromatic polyamide.

In above lithium-ion battery, the copolyaromatic polyamide is prepared by polymerizing a diamine aromatic compound with a dibasic acid chloride aromatic compound.

In above lithium-ion battery, the diamine aromatic compound is at least one selected from a group consisting of the compounds represented by the following chemical formulas:

Compound 1

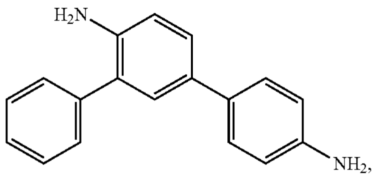

Compound 2

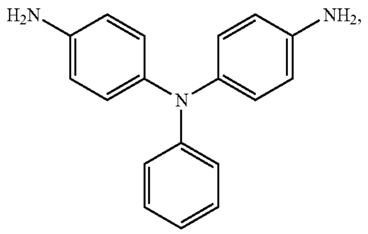

Compound 3

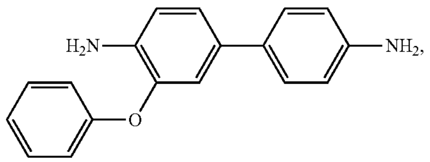

Compound 4

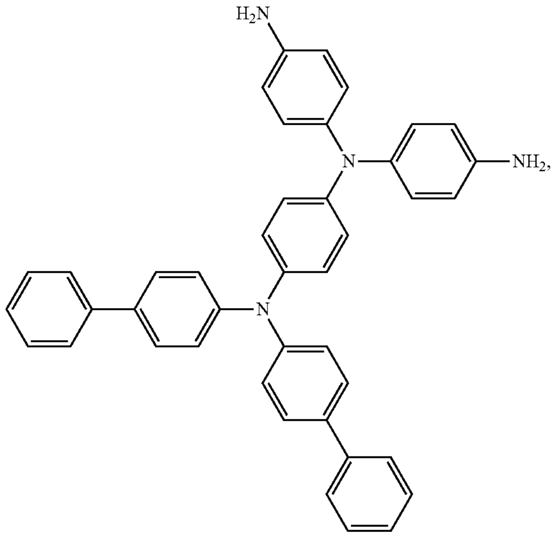

-continued
Compound 5
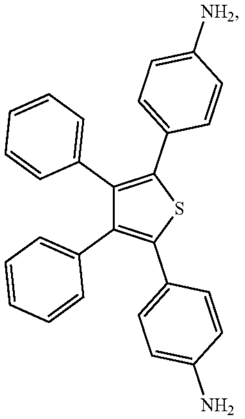
Compound 6
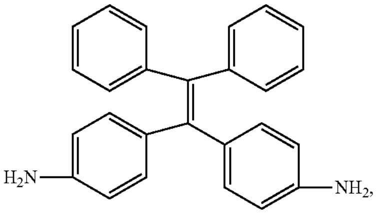
Compound 7
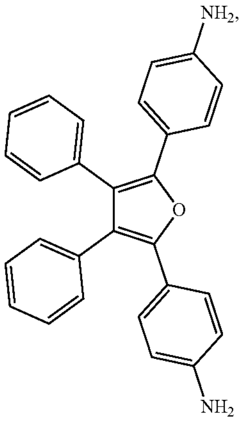
Compound 8
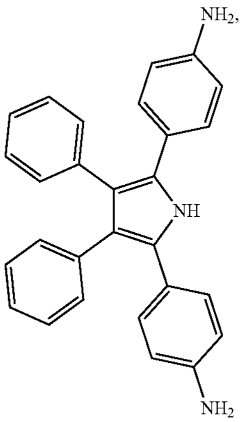
-continued
Compound 9
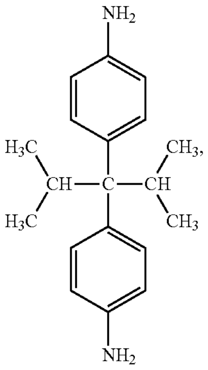
Compound 10
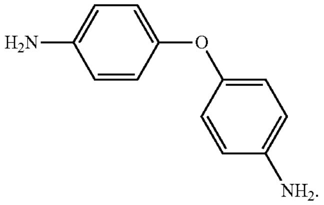
In above lithium-ion battery, wherein the dibasic acid chloride aromatic compound is at least one selected from a group consisting of the compounds represented by the following chemical formulas:
Compound 11
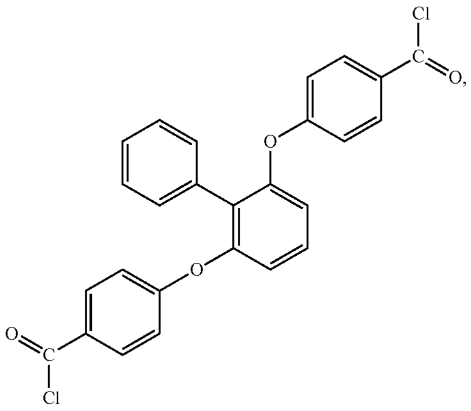
Compound 12
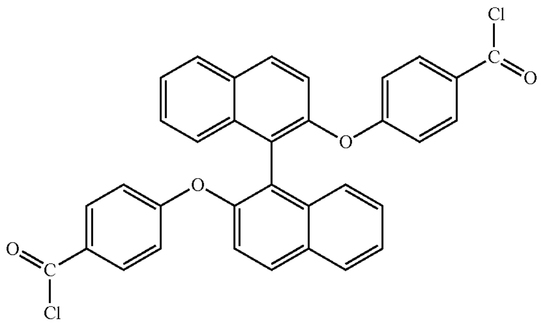

-continued

Compound 13

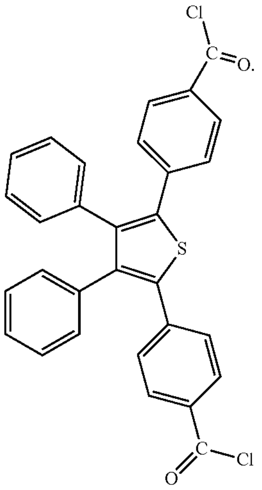

In above lithium-ion battery, the polydispersity index Mw/Mn of the aromatic polyamide is between 5 and 100, and the molecular weight thereof is between 1000 and 1000000.

In above lithium-ion battery, the first coating layer has a thickness of 0.5 to 20 μm.

In above lithium-ion battery, the linear ester compound is at least one selected from a group consisting of methyl ethyl carbonate, dimethyl carbonate, diethyl carbonate, dipropyl carbonate, methyl propyl carbonate, ethyl propyl carbonate, methyl propionate, methyl butyrate, ethyl acetate, ethyl propionate, ethyl butyrate, propyl propionate, methyl acetate.

In above lithium-ion battery, the electrolyte further comprises a cyclic ester compound, and the cyclic ester compound is at least one selected from a group consisting of vinyl carbonate, propylene carbonate, butylene carbonate, 1,4-butyrolactone, ethylene carbonate, propylene carbonate, butylene carbonate, vinyl ethylene carbonate.

In above lithium-ion battery, the electrolyte comprises a lithium salt, and the lithium salt is at least one selected from a group consisting of lithium hexafluorophosphate ($LiPF_6$), lithium tetrafluoroborate ($LiBF_4$), lithium hexafluoroarsenate, lithium perchlorate, lithium bis(oxalate)borate (LiBOB), lithium oxalyldifluroborate (LiDFOB), lithium bis(fluorosulfonyl)imide (LiFSI), bistrifluoromethanesulfonimide lithium (LiTFSI).

An aramid coating (i.e., a coating layer containing an aromatic polyamide) is used in the present invention, the aromatic polyamide contained in the coating layer swells or plasticizes under the action of a solvent and a lithium salt in the electrolyte at high temperature or normal temperature to increase the elongation of the separator, while improving the safety performance of the electrode assembly under the interaction between the aramid coating layer and the electrode active material or the binder.

DETAILED DESCRIPTION

The following examples are provided to enable those skilled in the art to understand the present application more fully, but do not limit the application in any way.

Through increasing the elongation of the aramid separator by plasticizing or swelling the aromatic polyamide in the electrolyte, and through the interaction of the aromatic polyamide and the electrolyte to occur swelling or plasticization, the adhesion between the separator and the electrode is improved in the present application, thereby improving the safety performance of the electrode assembly.

Specifically, when applying an aromatic polyamide with a certain elongation and high adhesion and high heat resistance to one or more surfaces of a PE (polyethylene)/PP (polypropylene) porous substrate, the solvent in the electrolyte diffuses into a molecular chain phases of the aromatic polyamide, and an lithium salt in the electrolyte may also coordinate with the amide bond in the aromatic polyamide to reduce hydrogen bonding between the molecular chains under normal temperature or high temperature conditions, so that the aromatic polyamide is swelled or plasticized to increase its elongation while causing the amide bond in the aramid coating layer to interact with (hydrogen bond) the anion and cathode active material or binder, and a adhesiveness is formed between the separator with the electrode to improve adhesive force between the separator and the electrode, and strengthening the safety performance of the electrode assembly under external force.

The present invention provides an aramid separator for lithium-ion battery comprising a porous substrate (comprising but not limited to PE (polyethylene)/PP (polypropylene)) and an aramid coating layer (i.e., a first coating layer), wherein the aramid coating layer comprises an aromatic polyamide, and the aromatic polyamide is one or more selected from a group consisting of para-aramid, meta-aramid, semi-aromatic polyamide (e.g., PA6T (poly(p-phenylene hexamethylene diamine))), copolyaromatic polyamide.

In the separator, the polydispersity index Mw/Mn of the aromatic polyamide is between 5 and 100, and the molecular weight thereof is between 1000 and 1000000. The smaller the dispersity index, the more uniform the molecular weight distribution, and the larger the dispersibility index, the wider the molecular weight distribution. When the polydispersity index is more than 100, the molecular weight is too dispersed, which is detrimental to the coordination of the solvent and the lithium salt in the electrolyte with the amide bond in the aromatic polyamide, and thus is detrimental to the increase of the elongation of aromatic polyamide. When the polydispersity index is less than 5, it is more difficult to prepare. Therefore, when the polydispersity index Mw/Mn of the aromatic polyamide is between 5 and 100, the elongation of the aromatic polyamide may be improved effectively.

In some examples, the molecular weight of aromatic polyamide is between 1000 and 1 million. When the molecular weight is too small, it is difficult for the solvent in the electrolyte to diffuse into the molecular chain phases of the aromatic polyamide. When the molecular weight is too large, the viscosity of the aromatic polyamide increases, which is disadvantageous for the coordination of the amide bond in the aromatic polyamide with the solvent and the lithium salt in the electrolyte. Therefore, when the molecular weight of the aromatic polyamide is between 1000 and 1000000, the elongation and adhesion of the separator may be improved.

The present invention provides a lithium-ion battery comprising a first coating layer and a second coating layer, wherein the second coating layer may be arranged between a porous substrate and the first coating layer. It is also possible that the first coating layer is arranged between the porous substrate and the second coating layer.

In some examples, the thickness of the aramid coating layer is between 0.5 and 20 This is because when the thickness of the coating layer is too small, the safety performance of the electrode assembly is low; when the thickness of the coating layer is too large, the penetration of lithium-ions is hindered. Therefore, when the thickness of the coating layer is 0.5-20 μm, the performance of the separator is improved while the safety performance of the electrode assembly under external force can be ensured.

In some examples, the electrolyte in which the above aromatic polyamide may swell or plasticize comprising a lithium salt and a linear ester compound, the lithium salt is at least one selected form a group consisting of lithium hexafluorophosphate ($LiPF_6$), lithium tetrafluoroborate ($LiBF_4$), lithium hexafluoroarsenate, lithium perchlorate, lithium bis(oxalate)borate (LiBOB), lithium oxalyldifluroborate (LiDFOB), lithium bis(fluorosulfonyl)imide (LiFSI), bistrifluoromethanesulfonimide lithium (LiTFSI), and the concentration of the lithium salt is from 0.5 mol/L to 3 mol/L.

The linear ester compound comprises at least one selected from a group consisting of methyl ethyl carbonate (MEC), dimethyl carbonate (DMC), diethyl carbonate (DEC), dipropyl carbonate (DPC), methyl propyl carbonate (MPC), ethyl propyl carbonate (EPC), methyl propionate, methyl butyrate (MB), ethyl acetate (EA), ethyl propionate (EP), propyl propionate (PP), ethyl butyrate (EB), methyl acetate.

In addition, the electrolyte further comprises a cyclic ester compound, and the cyclic ester compound comprises at least one selected from a group consisting of vinyl carbonate, propylene carbonate, butylene carbonate, 1,4-butyrolactone, ethylene carbonate (EC), propylene carbonate (PC), butylene carbonate (BC), vinyl ethylene carbonate (VEC).

The solubility parameter of the electrolyte ranges from 6 to 15 $(cal/cm^3)^{1/2}$. The solvent of the electrolyte diffuses into the molecular chain phases of the aromatic polyamide under normal temperature or high temperature conditions, and the solvent and lithium salt in the electrolyte coordinate with the amide bond to further reduce the hydrogen bonding between the molecular chains, causing the aromatic polyamide to swell or plasticize. Then, strong interactions such as hydrogen bonding between the swollen aromatic polyamide and the negative and positive active material or binder allow the aromatic polyamide to have a high elongation while providing an excellent adhesive force between the internal separator of the electrode assembly and the electrode.

Examples of the present application also provide a lithium-ion battery comprising above separator and electrolyte. The lithium-ion battery further comprises a positive electrode, a negative electrode, and the like.

The positive electrode of the lithium-ion battery comprises a positive current collector and a positive active material layer coated on the positive current collector, and the positive active material layer comprises a positive active material, a conductive agent, and a binder. The positive current collector may be one or more selected from a group consisting of copper foil, aluminum foil, nickel foil, and carbon-based current collector. Similarly, other positive current collectors commonly used in the art may be employed. The conductive agent may comprise one or more selected from a group consisting of conductive carbon black, lamellar graphite, graphene, and carbon nanotubes. The binder comprises one or more selected from a group consisting of polyvinylidene fluoride, a copolymer of vinylidene fluoride-hexafluoropropylene, a copolymer of styrene-acrylate, a copolymer of styrene-butadiene, polyamide, polyacrylonitrile, polyacrylate, polyacrylic acid, polyacrylate, sodium carboxymethyl cellulose, polyvinyl acetate, polyvinylpyrrolidone, polyvinyl ether, polymethylmethacrylate, polytetrafluoroethylene and polyhexafluoropropylene. The positive active material comprises, but is not limited to, lithium cobaltate, lithium nickelate, lithium manganate, lithium nickel manganese oxide, lithium nickel cobaltate, lithium iron phosphate, lithium nickel cobalt aluminate, lithium nickel cobalt manganese oxide or a combination thereof. The above positive active material comprises a positive active material which has been doped or coated in the prior art.

The negative electrode of the lithium-ion battery comprises a negative current collector and a negative active material layer arranged on the negative current collector. The negative electrode is prepared by coating a slurry of the negative active material layer on the negative current collector and followed by drying. The negative current collector may be one or more selected from a group consisting of copper foil, aluminum foil, nickel foil, and carbon-based current collector. The negative active material layer may comprise a negative active material and a dispersant. The negative active material may comprise one or more selected from a group consisting of artificial graphite, natural graphite, silicon carbide, mesophase carbon microspheres. The dispersant may comprise one or more selected from a group consisting of lithium carboxymethyl cellulose, sodium carboxymethyl cellulose. In addition, the negative active material layer may further comprise a binder, and the binder comprises one or more selected from a group consisting of polyvinylidene fluoride, a copolymer of vinylidene fluoride-hexafluoropropylene, a copolymer of styrene-acrylate, a copolymer of styrene-butadiene, polyamide, polyacrylonitrile, polyacrylate, polyacrylic acid, polyacrylate, sodium carboxymethylcellulose, polyvinylpyrrolidone, polyvinyl ether, polymethylmethacrylate, polytetrafluoroethylene and polyhexafluoropropylene.

An electrode assembly is obtained by winding or stacking the positive electrode, the separator and the negative electrode, and followed by packaging into, for example, an aluminum plastic film, injection of the electrolyte, forming, and packaging. Then, the prepared lithium-ion battery is subjected to a performance test.

Those skilled in the art will appreciate that the above described methods for preparing the lithium-ion battery are merely examples. Other methods commonly used in the art may be employed without departing from the disclosure of the present application.

The separator and electrolyte of the present application may be used in a lithium-ion battery of different structures. In the examples, a wound lithium-ion battery is taken as an example, but the separator and electrolyte of the present application may be applied to lithium-ion batteries of a laminated structure, a multi-tab structure or the like, all of which are contained in the scope of this application.

The negative electrode of the present application may be used in a lithium-ion battery of different types. In the examples, a soft pack lithium-ion battery is taken as an example, but the separator and electrolyte of the present application may be applied to other lithium-ion batteries such as square shell battery, cylindrical battery, all of which are contained in the scope of this application.

The preparation of the separator coating layer is described below:

Preparation of aramid coating layer: an aromatic polyamide polymer (i.e., an aramid material) is dissolved in a mixture of N,N-dimethylacetamide and calcium chloride (calcium chloride promotes the dissolution of the aromatic polyamide polymer in N,N-dimethylacetamide) to obtain an aramid pulp, wherein the mass ratio of the aromatic polyamide polymer to the calcium chloride is 90~95:4~6; then, the aramid slurry is uniformly coated on a surface of a porous substrate of 2~30 μm thick by a micro-concave coating method commonly used in the art to obtain a wet film, and the solvent is extracted in a wet film coagulation bath (the solvent used for the coagulation bath extraction is DMAC (dimethylacetamide) and NMP (N-methylpyrrolidone)) and then solidified and dried to obtain the aramid separator.

Preparation of inorganic coating layer: an inorganic filler and the binder (comprising but not limited to polyvinylidene fluoride (PVDF) and/or styrene butadiene rubber (SBR)) with a mass ratio of 90~97:2~7 are added into the solvent of water and mixed uniformly to form a slurry, i.e. an inorganic slurry; then, the inorganic slurry is uniformly coated on the surface of a porous substrate of 2~30 μm thick by a micro-concave coating method to obtain a wet film, and after the wet film is dried in an oven, a composite porous separator is obtained.

Preparation of organic coating layer: an organic substance is dispersed in an aqueous solution containing a binder (comprising but not limited to styrene-butadiene rubber (SBR)), wherein the mass ratio of the organic substance to the binder is 93~97:1~3, to obtain an organic slurry; then, the organic slurry is coated on the surface of the separator by spraying, and after being dried in an oven to obtain a composite porous separator.

The inorganic substance comprises one or more selected from a group consisting of silicon oxide, alumina, boehmite, titanium oxide, zinc oxide, magnesium oxide, magnesium hydroxide, calcium titanate, barium titanate, lithium phosphate, lithium titanium phosphate, lithium lanthanum titanate.

The organic substance comprise one or more selected from a group consisting of polymethyl methacrylate, polyvinylidene fluoride, polytetrafluoroethylene, polyvinylidene fluoride-hexafluoropropylene, polyhexafluoropropylene, polyacrylonitrile.

The following is a coating scheme for the aramid separator:

(1) coating the aramid slurry on one or both surfaces of the porous substrate, (2) coating the inorganic slurry on one or both surfaces of the porous substrate, and then coating the aramid slurry, (3) coating a mixed slurry of the aromatic polyamide slurry and the inorganic slurry on one or both surfaces of the porous substrate, (4) coating a mixed slurry of the aramid slurry and the organic slurry on one or both surfaces of the porous substrate, (5) coating the organic coating layer on the surface of the aramid coating layer after being coated, (6) coating the inorganic coating layer on the surface of the aramid coating layer after being coated.

Preparation of Electrode Assembly:

The active material of lithium cobaltate, conductive agent (such as carbon), and binder of polyvinylidene fluoride (PVDF) with a weight ratio of 90~96:1~5:1~5 are fully stirred and mixed in the solvent system of N-methylpyrrolidone, then coated on the Al foil, dried, cold-pressed, to obtain the positive electrode;

The active material of artificial graphite, conductive agent (such as carbon), binder of styrene-butadiene rubber (SBR) and dispersant of sodium carboxymethyl cellulose (CMC) with a weight ratio of 95~98:0.3~3:1~2:0.5~1 are fully stirred and mixed in the solvent system of deionized water, then coated on the Cu foil, dried, cold-pressed, to obtain the negative electrode.

An aramid separator prepared by the above coating layer is used as the separator. The electrolyte may employ the electrolyte described above. Those skilled in the art will appreciate that other positive and negative electrodes commonly used in the art may be employed. An electrode assembly is obtained by winding or stacking the positive electrode, the separator and the negative electrode, and followed by packaging into, for example, an aluminum plastic film for encapsulation, injection of the electrolyte, packaging and testing.

Some specific examples and comparative examples are listed below to better illustrate the application.

Example 1

The active material of lithium cobaltate, conductive agent of carbon, and binder of polyvinylidene fluoride (PVDF) with a weight ratio of 94:3:3 are fully stirred and mixed in the solvent system of N-methylpyrrolidone, then coated on the Al foil, dried, cold-pressed, to obtain the positive electrode;

The active material of artificial graphite, conductive agent of carbon, binder of styrene-butadiene rubber (SBR) and thickener of sodium carboxymethyl cellulose (CMC) with a weight ratio of 97:1:1.5:0.5 are fully stirred and mixed in the solvent system of deionized water, then coated on the Cu foil, dried, cold-pressed, to obtain the negative electrode.

The meta-aramid is dissolved in a mixture of N,N-dimethylacetamide and calcium chloride to obtain a meta-aramid slurry, then the slurry is uniformly coated on both surfaces of a porous substrate polyethylene of 5 μm thick by a micro-concave coating method to obtain a wet film, and the solvent is extracted in a wet film coagulation bath, and solidified and dried to obtain the aramid separator, wherein after drying the aramid coating layer, the thickness of which on both surfaces is 1 μm; the electrolyte is prepared by using EP+PP+$LiPF_6$ for the preparation of the whole battery, to obtain a lithium-ion battery.

Example 2

Consistent with the preparation method of Example 1, except that a para-aramid is used in Example 2 to prepare the aramid separator.

Example 3

Consistent with the preparation method of Example 1, except that a semi-aromatic polyamide PA6T (poly(p-phenylene hexamethylene diamine)) is used in Example 3 to prepare the aramid separator.

Example 4

Consistent with the preparation method of Example 1, except that a copolymerized aromatic polyamide 1 (made by copolymerization of Compound 1 and Compound 12) is used in Example 4 to prepare the aramid separator.

Example 5

Consistent with the preparation method of Example 1, except that a copolymerized aromatic polyamide 2 (made by copolymerization of Compound 5 and Compound 13, and a naphthyl group is introduced into the molecular chain) is used in Example 5 to prepare the aramid separator.

Example 6

Consistent with the preparation method of Example 1, except that a copolymerized aromatic polyamide 3 (made by copolymerization of Compound 7 and Compound 11, and a biphenyl group is introduced into the molecular chain) is used in Example 6 to prepare the aramid separator.

Example 7

Consistent with the preparation method of Example 1, except that a copolymerized aromatic polyamide 4 (made by copolymerization of Compound 2 and Compound 12, and fluorine and chlorine are introduced into the molecular side chain) is used in Example 7 to prepare the aramid separator.

Example 8

Consistent with the preparation method of Example 1, except that the aramid coating layer in Example 8 after being dried has a thickness of 0.5 μm on both surfaces.

Example 9

Consistent with the preparation method of Example 1, except that the aramid coating layer in Example 9 after being dried has a thickness of 2 μm on both surfaces.

Example 10

Consistent with the preparation method of Example 1, except that the aramid coating layer in Example 10 after being dried has a thickness of 4 μm on both surfaces.

Example 11

Consistent with the preparation method of Example 1, except that the aramid coating layer in Example 11 after being dried has a thickness of 5 μm on both surfaces.

Example 12

Consistent with the preparation method of Example 1, except that the aramid coating layer in Example 12 after being dried has a thickness of 10 μm on both surfaces.

Example 13

Consistent with the preparation method of Example 1, except that the aramid coating layer in Example 13 after being dried has a thickness of 20 μm on both surfaces.

Example 14

Consistent with the preparation method of Example 1, except that the meta-aramid slurry is coated on the surface of the porous substrate polyethylene facing the cathode to obtain the aramid separator in Example 14, the thickness of the aramid coating layer after being dried is 2 μm.

Example 15

Consistent with the preparation method of Example 1, except that the meta-aramid slurry is coated on the surface of the porous substrate polyethylene facing the anode to obtain the aramid separator in Example 15, wherein the aramid coating layer has a thickness of 2 μm after being dried.

Example 16

Consistent with the preparation method of Example 1, except that in Example 16 the meta-aramid slurry is mixed with a polyvinylidene fluoride (PVDF) slurry to form a mixed slurry, then the mixed slurry is uniformly coated on onto both surfaces of a 5 μm thick porous substrate polyethylene by micro-concave coating method to obtain a wet film, and the solvent is extracted in a wet film coagulation bath, and solidified and dried to obtain the aramid separator, wherein the aramid coating layer has a thickness of 1 μm on both surfaces after being dried.

Example 17

Consistent with the preparation method of Example 1, except that in Example 17 the meta-aramid slurry is mixed with an alumina slurry to form a mixed slurry, then the mixed slurry is uniformly coated onto both surfaces of a 5 μm thick porous substrate polyethylene by micro-concave coating method to obtain a wet film, and the solvent is extracted in a wet film coagulation bath, and solidified and dried to obtain the aramid separator, wherein the aramid coating layer has a thickness of 1 μm on both surfaces after being dried.

Example 18

Consistent with the preparation method of Example 1, except that in Example 18 the meta-aramid slurry is mixed with an alumina slurry and a PVDF slurry to form a mixed slurry, then the mixed slurry is uniformly coated onto both surfaces of a 5 μm thick porous substrate polyethylene by micro-concave coating method to obtain a wet film, and the solvent is extracted in a wet film coagulation bath, and solidified and dried to obtain the aramid separator, wherein the aramid coating layer has a thickness of 1 μm on both surfaces after being dried.

Example 19

Consistent with the preparation method of Example 1, except that in Example 19 the meta-aramid slurry is coated on both surfaces of the porous substrate polyethylene to obtain the aramid separator, wherein the aramid coating layer has a thickness of 1 μm after being dried, then an alumina slurry is coated on both surfaces (on the aramid coating layer) of the separator and dried in an oven to obtain a composite porous separator, wherein the alumina coating layer has a thickness of 1 μm on both surfaces after being dried.

Example 20

Consistent with the preparation method of Example 1, except that in Example 20 the meta-aramid slurry is coated on both surfaces of the porous substrate polyethylene to obtain the aramid separator, wherein the aramid coating layer has a thickness of 1 μm after being dried, then a PVDF slurry is coated on both surfaces (on the aramid coating layer) of the separator and dried in an oven to obtain a composite porous separator, wherein the PVDF coating layer has a thickness of 1 μm on both surfaces after being dried.

Example 21

Consistent with the preparation method of Example 1, except that in Example 21 the meta-aramid slurry is coated on both surfaces of the porous substrate polyethylene to obtain the aramid separator, wherein the aramid coating layer has a thickness of 1 μm after being dried, then a mixed slurry of a PVDF slurry and an alumina slurry (mass ratio is 1:1) is coated on both surfaces of the separator and dried in an oven to obtain a composite porous separator, wherein the mixed coating layer of alumina and PVDF has a thickness of 1 μm on both surfaces after being dried.

Example 22

Consistent with the preparation method of Example 1, except that in Example 22 an alumina slurry is coated on both surfaces of the porous substrate polyethylene and dried in an oven to obtain a composite porous separator, wherein the alumina coating layer has a thickness of 1 μm on both surfaces after being dried, and the meta-aramid slurry is coated on both surfaces of the separator (on the alumina coating layer) to obtain an aramid separator, wherein the aramid coating layer has a thickness of 1 μm on both surfaces after being dried.

Example 23

Consistent with the preparation method of Example 1, except that in Example 23 a PVDF slurry is coated on both surfaces of the porous substrate polyethylene and dried in an oven to obtain a composite porous separator, wherein the PVDF coating layer has a thickness of 1 μm after being dried, and the meta-aramid slurry is coated on both surfaces of the separator to obtain an aramid separator, wherein the aramid coating layer has a thickness of 1 μm on both surfaces after being dried.

Example 24

Consistent with the preparation method of Example 1, except that in Example 24 a mixed slurry of a PVDF slurry and an alumina slurry (mass ratio of which is 1:1) is coated on both surfaces of the porous substrate polyethylene and dried in an oven to obtain a composite porous separator, wherein the mixed coating layer of the PVDF and alumina has a thickness of 1 μm after being dried, then the meta-aramid slurry is coated on both surfaces of the separator to obtain an aramid separator, wherein the aramid coating layer has a thickness of 1 μm on both surfaces after being dried.

Example 25

Consistent with the preparation method of Example 1, except that the electrolyte of Example 25 is made of EC+PC+LiPF6.

Example 26

Consistent with the preparation method of Example 1, except that the electrolyte of Example 26 is made of DMC+EC+LiPF6.

Example 27

Consistent with the preparation method of Example 1, except that the electrolyte of Example 27 is made of EMC+DEC+$LiPF_6$.

Example 28

Consistent with the preparation method of Example 1, except that the electrolyte of Example 27 is made of EC+PC+FEC+$LiPF_6$.

Example 29

Consistent with the preparation method of Example 1, except that the electrolyte of Example 27 is made of EC+PC+VC+$LiPF_6$.

Comparative Example 1

Consistent with the preparation method of Example 1, except that in comparative Example 1 a alumina slurry is coated on both surfaces of the porous substrate polyethylene to obtain a composite porous separator, wherein the alumina coating layer has a thickness of 1 μm after being dried.

Comparative Example 2

Consistent with the preparation method of Example 1, except that in Comparative Example 2 a PVDF slurry is coated on both surfaces of the porous substrate polyethylene to obtain a composite porous separator, wherein the PVDF coating layer has a thickness of 1 μm after being dried.

Comparative Example 3

Consistent with the preparation method of Example 1, except that in Comparative Example 3 a mixed slurry of an alumina slurry and a PVDF slurry (mass ratio is 1:1) is coated on both surfaces of the porous substrate polyethylene to obtain a composite porous separator, wherein the mixed coating layer of alumina and PVDF has a thickness of 1 μm after being dried.

Finally, the test processes for the physical properties of the aramid separators prepared in Examples 1 to 29 and the separators prepared in Comparative Examples 1 to 3 are as follows:

(1) Test on the thickness of separator coating layer: the thickness of the separator substrate is first tested with a micrometer, then the thickness of the separator substrate after being coated is tested, and the thickness of the separator substrate is removed, to determine the thickness of the coating layer.

(2) Test on the elongation of the coating layer: the coating layer is coated on a Teflon disk to form a film after being dried, and then the tensile elongation is measured using a tensile tester at a test speed of 50 mm/min.

(3) Test on heat resistance: the coated separator is suspended with four corners being fixed, and baked with a heat gun at a temperature of 200° C., wherein the distance between the heat gun and the separator is 20 mm, and the baking time is 60s, then observing whether a surface of the separator is broken, and the unbroken is recorded as pass, otherwise it is recorded as NG (not passed);

(4) Test on wet pressure bonding: discharging the finished lithium-ion battery, disassembling the lithium-ion battery and preparing a test strip of a combination of a separator with a cathode and an anode; the sample width is 15 mm; then, the electrode and the separator are respectively subjected to a 180° peel test at a test speed of 50 mm/min, and the value of the peel force is recorded and converted into N/m.

(5) Nail test: the lithium-ion battery is fully charged, and the nail test is performed with a 6 mm steel nail at a test speed of 30 mm/s; recording whether lithium-ion battery is burning or not; if it does not burn, it is recorded as pass.

TABLE 1

| | Aramid material | Thickness per side of the aramid coating layer (μm) | Coating layer structure | First coating layer | Second coating layer | First coating layer | Electrolyte | elongation of aramid coating layer/% | Test on heat resistance | Nail test pass rate/% |
|---|---|---|---|---|---|---|---|---|---|---|
| Examples | | | | | | | | | | |
| 1 | Meta-aramid | 1 | Both sides | Aramid | / | / | EP + PP + $LiPF_6$ | 20% | pass | 70% |
| 2 | Para-aramid | 1 | Both sides | Aramid | / | / | EP + PP + $LiPF_6$ | 2% | pass | 50% |

TABLE 1-continued

| | Aramid material | Thickness per side of the aramid coating layer (μm) | Coating layer structure | First coating layer | Second coating layer | First coating layer | Electrolyte | elongation of aramid coating layer/% | Test on heat resistance | Nail test pass rate/% |
|---|---|---|---|---|---|---|---|---|---|---|
| 3 | Semi-aramid | 1 | Both sides | Aramid | / | / | EP + PP + $LiPF_6$ | 40% | pass | 100% |
| 4 | Copolymerized aromatic polyamide 1 | 1 | Both sides | Aramid | / | / | EP + PP + $LiPF_6$ | 60% | pass | 100% |
| 5 | Copolymerized aromatic polyamide 2 | 1 | Both sides | Aramid | / | / | EP + PP + $LiPF_6$ | 100% | pass | 100% |
| 6 | Copolymerized aromatic polyamide 3 | 1 | Both sides | Aramid | / | / | EP + PP + $LiPF_6$ | 100% | pass | 100% |
| 7 | Copolymerized aromatic polyamide 4 | 1 | Both sides | Aramid | / | / | EP + PP + $LiPF_6$ | 100% | pass | 100% |
| 8 | Meta-aramid | 0.5 | Both sides | Aramid | / | / | EP + PP + $LiPF_6$ | 20% | pass | 50% |
| 1 | Meta-aramid | 1 | Both sides | Aramid | / | / | EP + PP + $LiPF_6$ | 20% | pass | 70% |
| 9 | Meta-aramid | 2 | Both sides | Aramid | / | / | EP + PP + $LiPF_6$ | 20% | pass | 90% |
| 10 | Meta-aramid | 4 | Both sides | Aramid | / | / | EP + PP + $LiPF_6$ | 20% | pass | 100% |
| 11 | Meta-aramid | 5 | Both sides | Aramid | / | / | EP + PP + $LiPF_6$ | 20% | pass | 100% |
| 12 | Meta-aramid | 10 | Both sides | Aramid | / | / | EP + PP + $LiPF_6$ | 20% | pass | 100% |
| 13 | Meta-aramid | 20 | Both sides | Aramid | / | / | EP + PP + $LiPF_6$ | 20% | pass | 100% |
| 14 | Meta-aramid Polyamide | 2 | one side (Facing cathode) | Aramid | / | / | EP + PP + $LiPF_6$ | 20% | pass | 70% |
| 15 | Meta-aramid | 2 | One side (facing anode) | Aramid | / | / | EP + PP + $LiPF_6$ | 20% | pass | 70% |
| 1 | Meta-aramid | 1 | Both sides | Aramid | / | / | EP + PP + $LiPF_6$ | 20% | pass | 70% |
| 16 | Meta-aramid | 1 | Both sides | Mixture of aramid and PVDF | / | / | EP + PP + $LiPF_6$ | 10% | pass | 80% |
| 17 | Meta-aramid | 1 | Both sides | Mixture of aramid and alumina | / | / | EP + PP + $LiPF_6$ | 50% | pass | 100% |
| 18 | Meta-aramid | 1 | Both sides | Mixture of aramid, alumina and PVDF | / | / | EP + PP + $LiPF_6$ | 30% | pass | 90% |
| 19 | Meta-aramid | 1 | Both sides | Aramid | Alumina (1 μm thickness for each side) | / | EP + PP + $LiPF_6$ | 20% | pass | 100% |
| 20 | Meta-aramid | 1 | Both sides | Aramid | PVDF | / | EP + PP + $LiPF_6$ | 20% | pass | 100% |
| 21 | Meta-aramid | 1 | Both sides | Aramid | Mixture of PVDF and alumina | / | EP + PP + $LiPF_6$ | 20% | pass | 100% |
| 22 | Meta-aramid | 1 | Both sides | / | Alumina coating layer (1 um thickness for each side) | Aramid | EP + PP + $LiPF_6$ | 20% | pass | 100% |
| 23 | Meta-aramid | 1 | Both sides | / | PVDF coating layer | Aramid | EP + PP + $LiPF_6$ | 20% | pass | 100% |

TABLE 1-continued

| | Aramid material | Thickness per side of the aramid coating layer (μm) | Coating layer structure | First coating layer | Second coating layer | First coating layer | Electrolyte | elongation of aramid coating layer/% | Test on heat resistance | Nail test pass rate/% |
|---|---|---|---|---|---|---|---|---|---|---|
| 24 | Meta-aramid | 1 | Both sides | / | Mixture of PVDF and alumina | Aramid | EP + PP + $LiPF_6$ | 20% | pass | 100% |
| 1 | Meta-aramid | 1 | Both sides | Aramid | / | / | EP + PP + $LiPF_6$ | 20% | pass | 70% |
| 25 | Meta-aramid | 1 | Both sides | Aramid | / | / | EC + EP + $LiPF_6$ | 20% | pass | 65% |
| 26 | Meta-aramid | 1 | Both sides | Aramid | / | / | PP + EC + $LiPF_6$ | 30% | pass | 67% |
| 27 | Meta-aramid | 1 | Both sides | Aramid | / | / | EC + BC + $LiPF_6$ | 40% | pass | 45% |
| 28 | Meta-aramid | 1 | Both sides | Aramid | / | / | EP + PP + EC + $LiPF_6$ | 40% | pass | 60% |
| 29 | Meta-aramid | 1 | Both sides | Aramid | / | / | EC + PC + EP + $LiPF_6$ | 40% | pass | 50% |
| Comparative Examples | | | | | | | | | | |
| 1 | | | | Alumina (1 um) thickness for each side coating layer) | / | / | EP + PP + $LiPF_6$ | 0% | pass | 0% |
| 2 | | | Both sides | PVDF | / | / | EP + PP + $LiPF_6$ | 0% | pass | 0% |
| 3 | | | Both sides | Mixture of alumina and PVDF (1 um thickness for each side coating layer) | / | / | EP + PP + $LiPF_6$ | 0% | pass | 0% |

As can be seen from Table 1, according to Examples 1 to 7, by using an aramid coating layer made of aramid material, the elongation of the aramid separator is increased and up to 100%, and the pass rate of Nail test for the separator is as high as 100%, which indicates that the safety of the separator is stronger. In addition, Examples 1 to 7 further indicate that different aramid chemical structures have different influences on the toughness of aramid and have different elongations and swelling properties, resulting in different elongations and Nail test results, and the test results of the aramid separator made of copolymerized aromatic polyamide are the best. This is because the copolymerized aromatic polyamide is prepared by polymerizing a polyfunctional diamine aromatic compound with a polyfunctional dibasic acid chloride aromatic compound, and the degree of regularity may be broken by copolymerization, thereby breaking the hydrogen bond between the para- or meta-aramid molecular chains, increasing the flexibility of the aromatic polyamide, and further increasing the elongation of the aromatic polyamide. Furthermore, the copolymerized aromatic polyamide molecular side chain may comprise one or more selected from a group consisting of fluorine, chlorine, methyl, nitro, and sulfonic acid groups, and a rigid structure such as a naphthyl group, a fluorenyl group or a biphenyl group, an aliphatic tough structure, a heterocyclic structure, a diacetylene structure, an N-substituted structure and a hyperbranched structure may also be introduced into the polyamide molecular chain to destroy the regularity of the molecular chain, reduce the hydrogen-bond interaction, increase the solubility of the aromatic polyamide, and further improves the adhesion of the aramid separator.

Comparing the results of Examples 1 to 7 with those of Comparative Examples 1 to 3, it is understood that the aramid separator significantly improves the elongation, heat resistance and safety of the separator of the lithium-ion battery. And comparing the results of Example 1 with Comparative Example 2, it is understood that the aromatic polyamide has a high elongation, heat resistance and a high pass rate for Nail test under the conditions of a coating layer thickness in Example 1 with Comparative Example 2 being 1 μm and the same electrolyte conditions. This is because, in the aramid separator, when coating an aromatic polyamide having both high adhesion and high heat resistance to both surfaces of a PE (polyethylene) substrate, the solvent in the electrolyte diffuses into the molecular chain phases of the aromatic polyamide to reduce hydrogen-bond interaction between the molecular chains, and the lithium salt in the electrolyte may also coordinate with the amide bond in the aromatic polyamide to further reduce hydrogen-bond interaction between the molecular chains under normal temperature or high temperature conditions, so that the aromatic polyamide is swelled or plasticized to increase its elongation while causing the amide bond in the aramid coating layer to interact (hydrogen bond) with the positive and negative active material or binder, and a adhesiveness is formed between the separator with the electrode to improve adhesive force between the separator and the electrode, and the safety performance of the electrode assembly under external force is strengthened.

According to the results of Examples 1, 8 to 13, it is understood that the thickness of the aramid coating layer is different, which will result in different heat resistance of the separator, and the thicker the coating layer, the better the heat resistance and the higher the pass rate of the Nail test. This is because when the thickness of the coating layer is too small, the safety performance of the lithium-ion battery is low, thus the pass rate of Nail test is low; when the thickness of the coating layer is too large, the penetration of lithium-ions is hindered. Therefore, when the thickness of the coating layer is 0.5-20 μm, the performance of the separator is improved while the safety performance of the lithium-ion battery is ensured under external force.

According to the results of Examples 1, 14 to 15, it can be found that regardless of whether the aramid coating layer is coated on one surface or both surfaces of the porous substrate polyethylene, the heat resistance and the pass rate for Nail test of the separator are at the same level. This is because when the same kind of aromatic polyamide is prepared into the same thickness of the aramid coating layer, the heat resistance and the pass rate for Nail test are the same.

According to Examples 16 to 24, it can be found that by changing the composition and structure of different aramid coating layers, the elongation and heat resistance of the aramid coating layer are changed, and the pass rate for Nail test is also different. By comparing the results of Examples 16, 17, and 18, it can be found that the aramid coating layer prepared by a mixture of alumina and aromatic polyamide, a mixture of PVDF and aromatic polyamide or a mixture of alumina, PVDF and aromatic polyamide have a change in elongation, and are different in Nail test results. Further, by comparing the results of Examples 16, 20, and 23, comparing the results of Examples 17, 19, and 22, and comparing the results of Examples 18, 21, and 24, it can be found that different structures of aramid coating layer result in different elongations and pass rates for Nail test, but when the aramid slurry is used alone to prepare the coating layer, the position of the aramid coating layer does not affect the elongation and pass rate for Nail test.

Moreover, comparing the results of Examples 16 to 18 with those of Comparative Examples 1 to 3, it can be found that the coating layer with aromatic polyamide has a higher elongation and a better Nail test effect, while the coating layers coated with alumina, PVDF, and a mixture of alumina and PVDF do not have the property of elongation and can not improve Nail test. This is because when an aromatic polyamide with both high adhesion and high heat resistance is coated on both surfaces of a PE substrate, the solvent in the electrolyte diffuses into the molecular chain phases of the aromatic polyamide to reduce hydrogen bond interaction between the molecular chains, and the lithium salt in the electrolyte may also coordinate with the amide bond in the aromatic polyamide to further reduce hydrogen bond interaction between the molecular chains under normal temperature or high temperature conditions, so that the aromatic polyamide is swelled or plasticized to increase its elongation while causing the amide bond in the aramid coating layer to interact with the positive and negative active material or binder, and a adhesiveness is formed between the separator with the electrode to improve adhesive force between the separator and the electrode, and the safety performance of the lithium-ion battery under external force is strengthened According to the results of Examples 1, 25 to 29, it can be found that, by only changing the electrolyte composition while other conditions keep the same, the kinds of electrolyte will affect the elongation of the aromatic polyamide and affect Nail test results. This is because the solvent in the electrolyte may diffuse into the molecular chain phase of the aromatic polyamide to reduce the hydrogen bond interaction between the molecular chains, and different electrolytes have different abilities to diffuse into the molecular chain phase of the aromatic polyamide, resulting in different elongations and safety properties of the prepared aramid separator.

Those skilled in the art will appreciate that the above-described examples are merely exemplary examples, and various changes, substitutions and changes may be made without departing from the spirit and scope of the present application.

What is claimed is:

1. A lithium-ion battery, comprising:

a separator; and an electrolyte; wherein the separator comprises a porous substrate and a first coating layer, the first coating comprises a copolyaromatic polyamide, and the electrolyte comprises a linear ester compound; and wherein the first coating layer has a thickness of 0.5 μm to 1 μm;

wherein the copolyaromatic polyamide is a polymer comprising structural units resulting from polymerization of a diamine aromatic compound with a dibasic acid chloride aromatic compound;

wherein the diamine aromatic compound comprises one or more selected from the group consisting of compounds represented by the following chemical formulas:

Compound 1

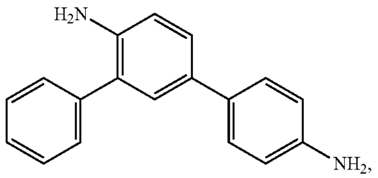

Compound 2

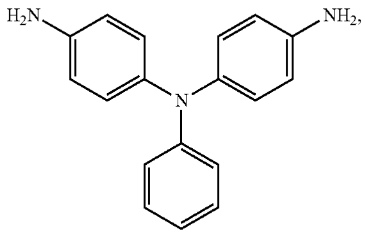

Compound 3

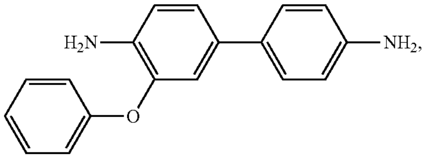

-continued

Compound 4

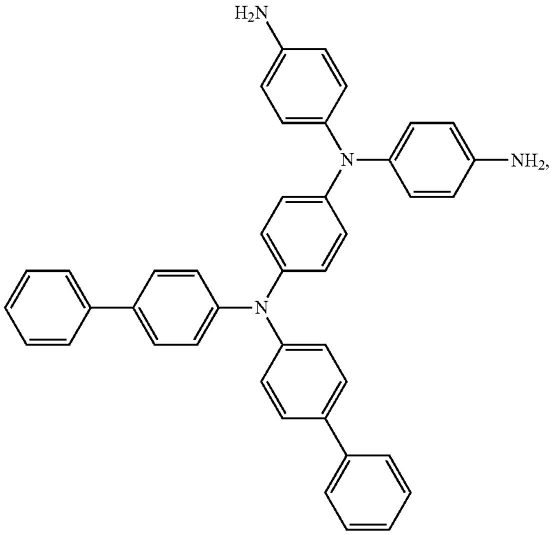

Compound 6

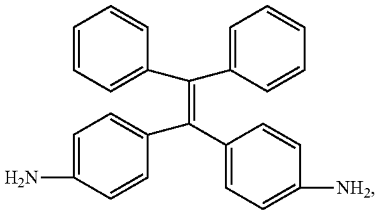

Compound 7

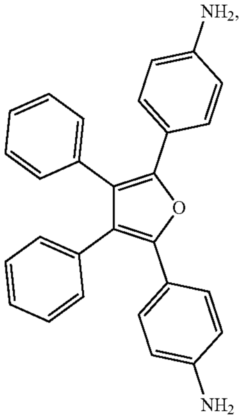

Compound 8

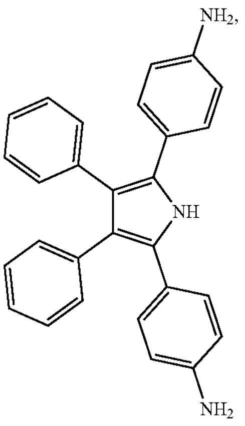

and

-continued

Compound 9

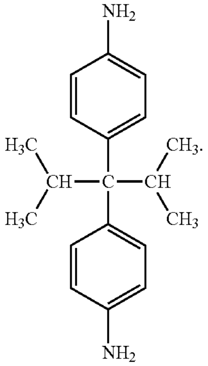

Compound 10

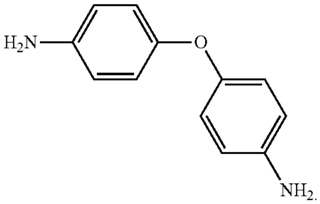

2. The lithium-ion battery according to claim 1, wherein the first coating layer is arranged on at least one surface of the porous substrate.

3. The lithium-ion battery according to claim 1, wherein the separator further comprises a second coating layer, and the second coating layer comprises inorganic particles, a polymer or a combination thereof.

4. The lithium-ion battery according to claim 3, wherein the second coating layer comprises the inorganic particles; and the inorganic particles comprise one or more selected from the group consisting of silicon oxide, alumina, titanium oxide, zinc oxide, magnesium oxide, boehmite, magnesium hydroxide, calcium titanate, barium titanate, lithium phosphate, lithium titanium phosphate, lithium lanthanum titanate.

5. The lithium-ion battery according to claim 3, wherein the second coating layer comprises the polymer; and the polymer comprises one or more selected from the group consisting of polymethyl methacrylate, polyvinylidene fluoride, polytetrafluoroethylene, a copolymer of vinylidene fluoride-hexafluoropropylene, polyhexafluoropropylene, polyacrylonitrile.

6. The lithium-ion battery according to claim 3, wherein the second coating layer is formed on the surface of the first coating layer.

7. The lithium-ion battery according to claim 1, wherein the first coating layer further comprises inorganic particles, a polymer or a combination thereof.

8. The lithium-ion battery according to claim 7, wherein the first coating layer comprises the inorganic particles; and the inorganic particles comprise one or more selected from the group consisting of silicon oxide, alumina, titanium oxide, zinc oxide, magnesium oxide, boehmite, magnesium hydroxide, calcium titanate, barium titanate, lithium phosphate, lithium titanium phosphate, lithium lanthanum titanate.

9. The lithium-ion battery according to claim 7, wherein the first coating layer comprises the polymer; and the polymer comprises one or more selected from the group consisting of polymethyl methacrylate, polyvinylidene fluoride, polytetrafluoroethylene, a copolymer of vinylidene fluoride-hexafluoropropylene, polyhexafluoropropylene, polyacrylonitrile.

10. The lithium-ion battery according to claim 1, wherein a solubility of the electrolyte ranges from 6 to 15 $(cal/cm^3)^{1/2}$.

11. The lithium-ion battery according to claim 1, wherein the diamine aromatic compound further comprises one or more selected from the group consisting of the compounds represented by the following chemical formulas:

Compound 5

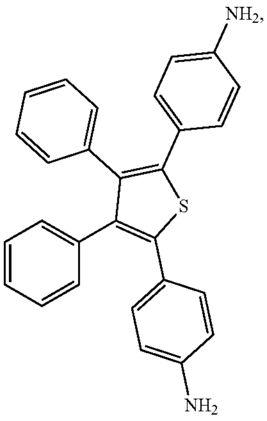

and

Compound 10

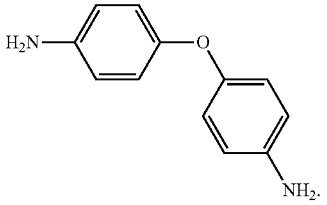

12. The lithium-ion battery according to claim 1, wherein the dibasic acid chloride aromatic compound comprises one or more selected from a group consisting of the compounds represented by the following chemical formulas:

Compound 11

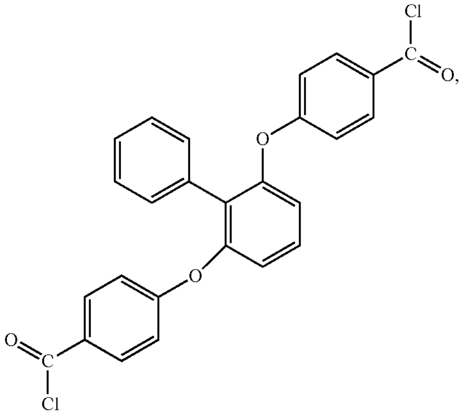

-continued

Compound 12

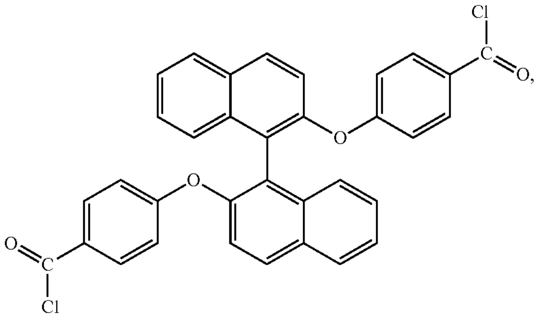

and

Compound 13

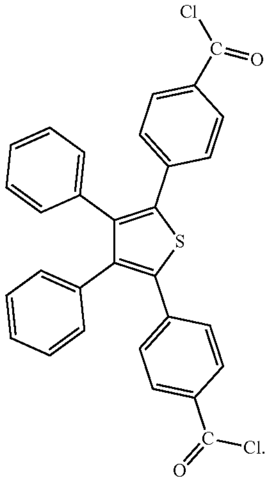

13. The lithium-ion battery according to claim 1, wherein the polydispersity index Mw/Mn of the aromatic polyamide is between 5 and 100, and the molecular weight thereof is between 1000 and 1000000.

14. The lithium-ion battery according to claim 1, wherein the linear ester compound comprises comprises one or more selected from a group consisting of methyl ethyl carbonate, dimethyl carbonate, diethyl carbonate, dipropyl carbonate, methyl propyl carbonate, ethyl propyl carbonate, methyl propionate, methyl butyrate, ethyl acetate, ethyl propionate, ethyl butyrate, propyl propionate, methyl acetate.

15. The lithium-ion battery according to claim 1, wherein the electrolyte further comprises a cyclic ester compound; and the cyclic ester compound comprises one or more selected from a group consisting of vinyl carbonate, propylene carbonate, butylene carbonate, 1,4-butyrolactone, ethylene carbonate, vinyl ethylene carbonate.

16. The lithium-ion battery according to claim 1, wherein the electrolyte comprises a lithium salt; and the lithium salt comprises one or more selected from a group consisting of lithium hexafluorophosphate, lithium tetrafluoroborate, lithium hexafluoroarsenate, lithium perchlorate, lithium bis (oxalate) borate, lithium oxalyldifluroborate, lithium bis (fluorosulfonyl)imide, bistrifluoromethanesulfonimide lithium.

* * * * *